US008136105B2

(12) United States Patent
Eichenberger et al.

(10) Patent No.: US 8,136,105 B2
(45) Date of Patent: Mar. 13, 2012

(54) METHOD TO EXPLOIT SUPERWORD-LEVEL PARALLELISM USING SEMI-ISOMORPHIC PACKING

(75) Inventors: Alexandre E. Eichenberger, Chappaqua, NY (US); Kai-Ting Amy Wang, North York, CA (US); Peng Wu, Mt. Kisco, NY (US); Peng Zhao, North York, CA (US)

(73) Assignee: International Business Machines Corporation, Armonk, NY (US)

( * ) Notice: Subject to any disclaimer, the term of this patent is extended or adjusted under 35 U.S.C. 154(b) by 1440 days.

(21) Appl. No.: 11/536,990

(22) Filed: Sep. 29, 2006

(65) Prior Publication Data

US 2008/0127144 A1    May 29, 2008

(51) Int. Cl.
*G06F 9/45* (2006.01)
(52) U.S. Cl. ............................................ 717/149
(58) Field of Classification Search .................. 717/149
See application file for complete search history.

(56) References Cited

U.S. PATENT DOCUMENTS

| 6,106,575 | A  | * | 8/2000 | Hardwick | 717/119 |
| 7,475,392 | B2 | * | 1/2009 | Eichenberger et al. | 717/150 |
| 7,478,377 | B2 | * | 1/2009 | Eichenberger et al. | 717/150 |
| 7,797,691 | B2 | * | 9/2010 | Cockx et al. | 717/155 |
| 2004/0064810 | A1 | * | 4/2004 | Wang et al. | 717/159 |
| 2005/0188364 | A1 | * | 8/2005 | Cockx et al. | 717/159 |
| 2005/0273769 | A1 | * | 12/2005 | Eichenberger et al. | 717/136 |
| 2005/0273770 | A1 | * | 12/2005 | Eichenberger et al. | 717/136 |
| 2005/0283774 | A1 | * | 12/2005 | Eichenberger et al. | 717/151 |
| 2005/0283775 | A1 |   | 12/2005 | Eichenberger et al. | |

OTHER PUBLICATIONS

Lawrsen, et al. "Exploiting Superword Level Parallelism with Multimedia Instruction Sets". MIT Laboratory for Computer Science. Cambridge, MA 02139. 2000. 12 pages.
Daily. "Beyond Instruction Level Parallelism-Multihreading". EE482: Advanced Computer Organization Processor Architecture. Standford University. Lecture #12. May 8, 2000.
Wu, et al. "MIMD Programs on SIMD Architectures". Department of Computer Science State University of New York at Buffalo. 1996. pp. 162-170.

* cited by examiner

*Primary Examiner* — John Chavis
(74) *Attorney, Agent, or Firm* — Cantor Colburn LLP

(57) ABSTRACT

A computer program product is provided for extracting SIMD parallelism. The computer program product includes instructions for providing a stream of input code comprising basic blocks; identifying pairs of statements that are semi-isomorphic with respect to each other within a basic block; iteratively combining into packs, pairs of statements that are semi-isomorphic with respect to each other, and combining packs into combined packs; collecting packs whose statements can be scheduled together for processing; and generating SIMD instructions for each pack to provide for extracting the SIMD parallelism..

14 Claims, 7 Drawing Sheets

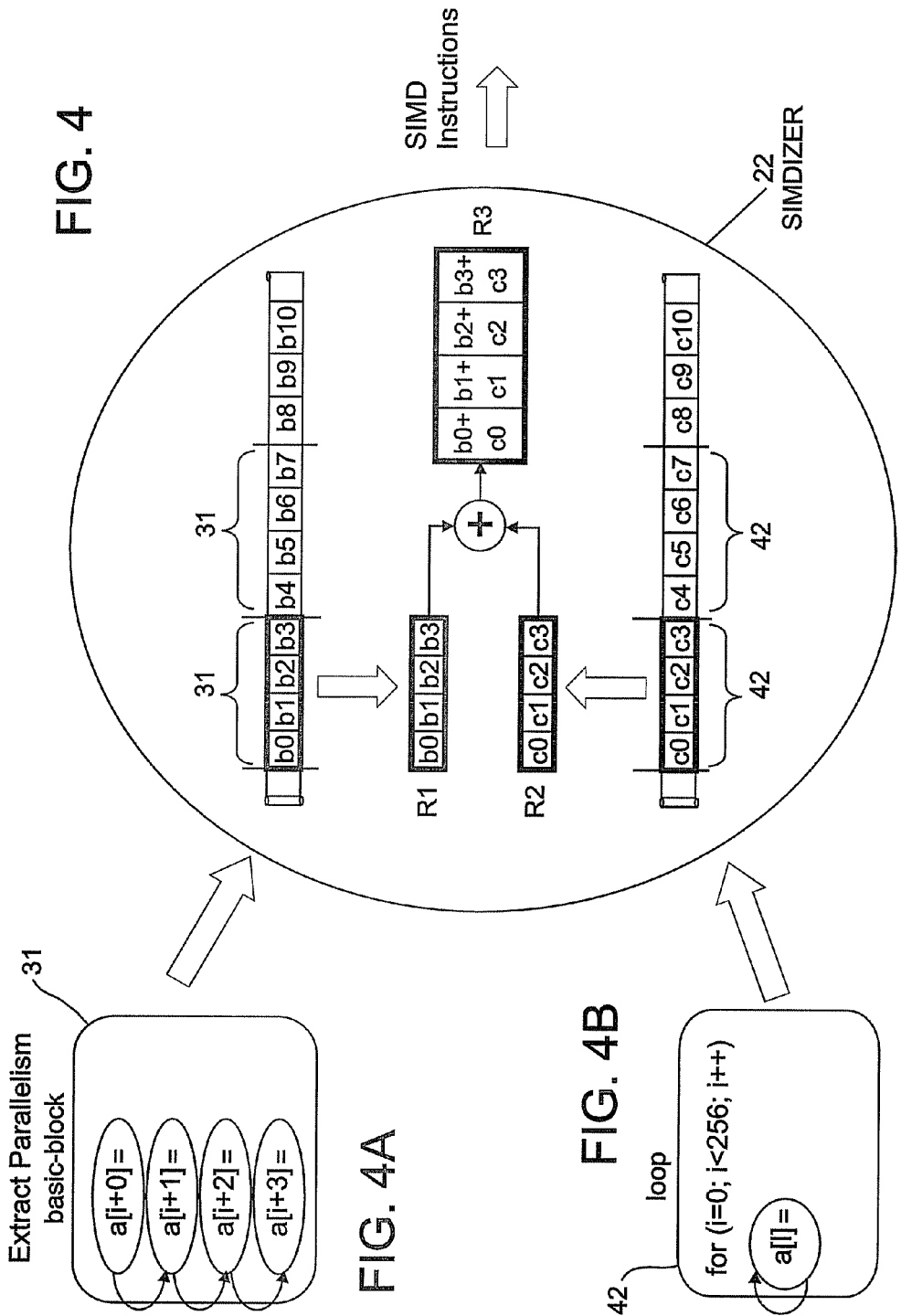

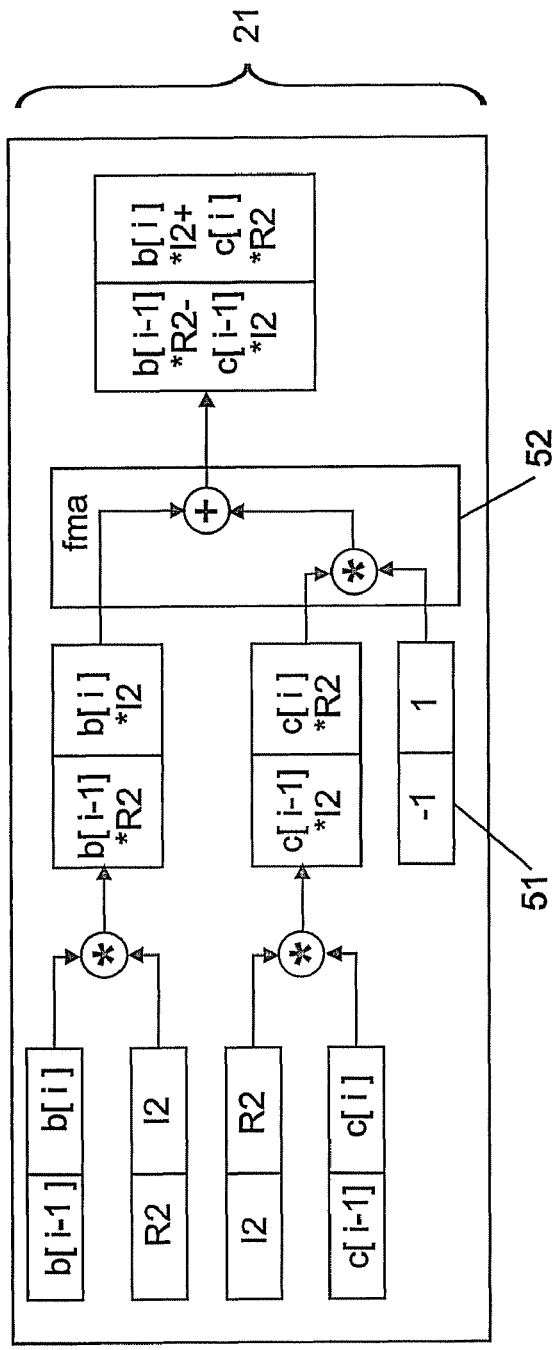

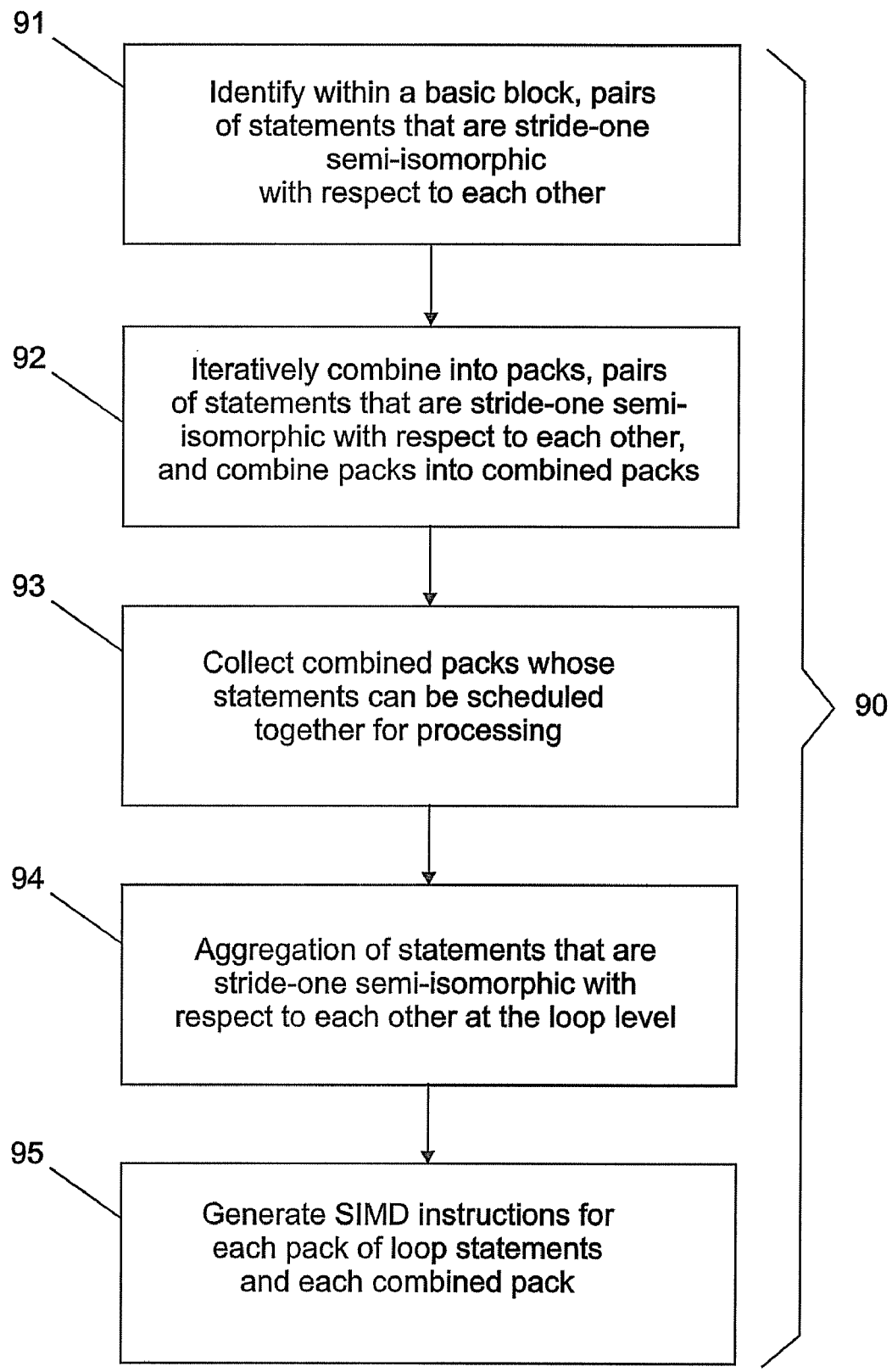

METHOD TO EXPLOIT SUPERWORD-LEVEL PARALLELISM USING SEMI-ISOMORPHIC PACKING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to improving computer processing speed by enhancing Superword Level Parallelism.

2. Description of the Related Art

It is well known that computer processing speed has increased through the use of parallel processing. One form of parallel processing relies on a Single Instruction Multiple Data (SIMD) architecture. SIMD architecture processes multiple data packed into a vector register in a single instruction, such as SSE for Pentium, VMX for PPC970, CELL, and Dual FPU for BlueGene/L. The type of parallelism exploited by SIMD architecture is referred to as SIMD parallelism. The process to automatically generate SIMD operations from sequential computation is referred to as extracting SIMD parallelism.

One approach to extracting SIMD parallelism from input code is the Superword Level Parallelism (SLP) approach. The SLP approach packs multiple isomorphic statements that operate on data, located in adjacent memory, into one or more SIMD operations. The drawback to SLP is that it relies heavily on identifying isomorphic computation. Two statements are "isomorphic" with respect to each other if each statement performs the same set of operations in the same order as the other statement and the corresponding memory operations access adjacent memory locations. Table 1 presents an example of four statements (in C syntax) that are isomorphic in relation to each other.

TABLE 1

Statements With Isomorphic Relationship a[4i + 0] = b[4i + 0] + c[4i − 1]
a[4i + 1] = b[4i + 1] + c[4i + 0]
a[4i + 2] = b[4i + 2] + c[4i + 1]
a[4i + 3] = b[4i + 3] + c[4i + 2]

The statements in Table 1 are isomorphic in relation to each other because each statement performs two load operations, one addition operation, and one store operation in the same order. Furthermore, the corresponding memory operations in these statements (or any statements with an isomorphic relation) must access operations that are either adjacent or identical. For example, the memory access of a [4i+0] is adjacent to the memory access of a [4i+1]. Likewise, a [4i+1] is adjacent to a [4i+2]. Similarly, the memory accesses of "b" and "c" are adjacent.

Extracting SIMD parallelism using SLP requires that the relationship between statements meet the isomorphic definition. Opportunities may exist for extracting SIMD parallelism from statements that do not meet the isomorphic definition. For example, computation on the real and imaginary parts of complex numbers often does not satisfy the isomorphic definition.

Today's SIMD architectures are introducing Multiple Instruction Multiple Data (MIMD) instructions that may perform different computation on different elements of a vector. For instance, the ADDSUBPS instruction in SSE3 (Streaming SIMD Extensions by Intel) performs an add operation on odd elements of input vectors and a subtract operation on even elements of input vectors. As this trend continues, there is an increased need to extract non-isomorphic SIMD parallelism.

What is needed is a way to extract SIMD parallelism from computations that do meet some but not all of the isomorphic criteria.

SUMMARY OF THE INVENTION

Disclosed is a computer program product stored on machine readable media and providing instructions for extracting SIMD parallelism from statements that are not isomorphic with respect to each other, the instructions including: providing a stream of input code including basic blocks; identifying within a basic block, pairs of statements that are semi-isomorphic with respect to each other; iteratively combining into packs, the pairs of statements, and combining the packs into combined packs; collecting the combined packs whose statements can be scheduled together for processing; and generating SIMD instructions for each collected combined pack to provide for extracting the SIMD parallelism.

Also disclosed is a computer implemented method for extracting SIMD parallelism from statements that are not isomorphic with respect to each other, the method including: providing a stream of input code including basic blocks; identifying within a basic block, pairs of statements that are stride-one semi-isomorphic with respect to each other; iteratively combining into packs, the pairs of statements, and combining the packs into combined packs; collecting the combined packs whose statements can be scheduled together for processing; aggregating into packs statements that are stride-one semi-isomorphic with respect to each other at the loop level; and generating SIMD instructions for each pack of loop statements and each of the combined packs to provide for extracting the SIMD parallelism.

Further disclosed is a computer program product stored on machine readable media and providing instructions for extracting SIMD parallelism from statements that are not isomorphic with respect to each other, the instructions including: providing a stream of input code including basic blocks; identifying within a basic block, pairs of statements, X and Y, that are semi-isomorphic with respect to each other by satisfying at least one condition where: X and Y are identical, X and Y are literals, X and Y are loaded from adjacent memory locations, X and Y are stored to adjacent memory locations and the stored values are semi-isomorphic with respect to each other, X and Y have the same number of operands and their corresponding operands are semi-isomorphic with respect to each other; iteratively combining into packs, the pairs of statements, and combining the packs into combined packs; collecting the combined packs whose statements can be scheduled together for processing; and generating SIMD instructions for each collected combined pack to provide for extracting the SIMD parallelism.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution in which a computer program product stored on machine readable media and providing instructions for extracting SIMD parallelism from statements that are not isomorphic with respect to each other, is provided and has instructions including: providing a stream of input code comprising basic blocks; identifying within a basic block, pairs of statements, X and Y, that are semi-isomorphic with respect to each other by satisfying at least one condition where: X and Y are identical, X and Y are literals, X and Y are loaded from adjacent memory locations, X and Y are stored to adjacent memory locations and the stored values are semi-isomorphic with respect to each other, X and Y have the same number of operands and their corresponding operands are semi-isomorphic with respect to each other; iteratively combining into packs, the pairs of statements, and combining the packs into combined packs; collecting the combined packs whose statements can be scheduled together for processing; and generating SIMD instructions for each collected combined pack to provide for extracting the SIMD parallelism.

As a result of the summarized invention, technically we have achieved a solution that extracts SIMD parallelism from statements that are not fully isomorphic with respect to each other. This means we can increase the speed of parallel processing through SIMD architectures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates the concept of extracting SIMD parallelism;

FIG. 5 illustrates one example of SIMD execution of semi-isomorphic statements presented in Table 2;

FIG. 6 illustrates one example of packable statements with stride-one memory accesses;

FIG. 9 is a flow chart of a method of packing statements that are stride-one semi-isomorphic in relation to each other.

The detailed description explains the preferred embodiments of the invention, together with advantages and features, by way of example with reference to the drawings.

DETAILED DESCRIPTION OF THE INVENTION

The teachings herein provide for extracting SIMD parallelism from input code. The method for extracting SIMD parallelism meets some of the isomorphic criteria. As disclosed herein, the extraction of SIMD parallelism is directed to compiler architecture. However, one skilled in the art will understand that the teachings may be applied to compiler architecture, software architecture, and circuit design where steps for extracting SIMD parallelism are performed.

As used herein, the terms "isomorphic" and "semi-isomorphic" relate to aspects of statements within the input code, where the statements are considered in relation to each other. For example, one statement is isomorphic in relation to another statement when one statement performs the same operations and in the same order as the other statement. As another example, one statement is semi-isomorphic in relation to another statement when one statement performs the same operations and in the same order as the other statement with the exception that at least one mathematical operation is different. For example, one statement will use a "+" operation in lieu of a "−" operation in the other statement.

Accordingly, the term "pairing" relates to combining two statements with an isomorphic or semi-isomorphic relationship, into a group called a pair.

Accordingly, the term "packing" relates to combining two or more statements, into a group called a pack.

Figure 1:
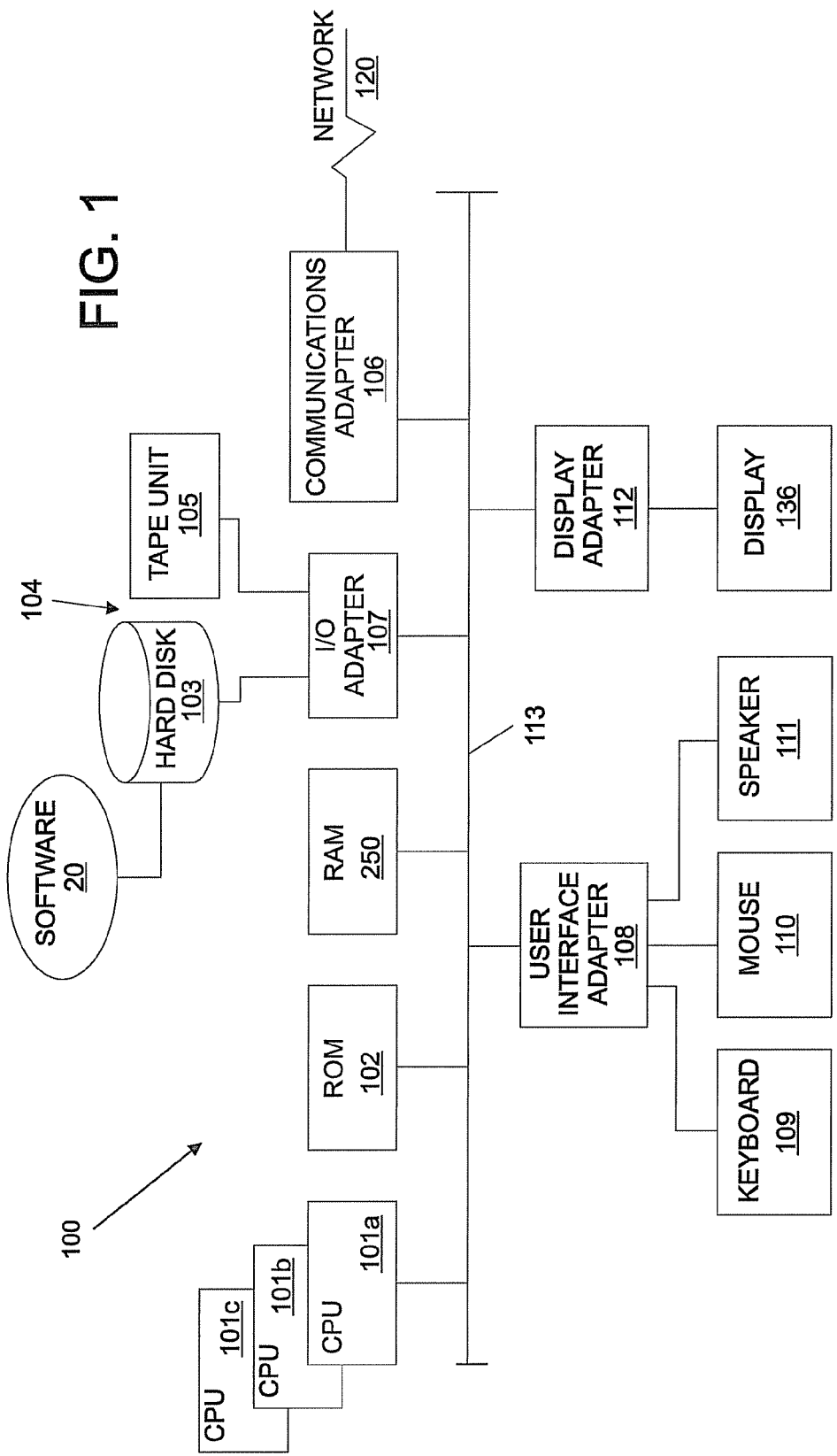
FIG. 1 depicts aspects of a computing infrastructure for implementation of the teachings herein.

Referring now to FIG. 1, an embodiment of a computer processing system 100 for implementing the teachings herein is depicted. System 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 250 and various other components via a system bus 113. Read only memory (ROM) 102 is coupled to the system bus 113 and may include a basic input/output system (BIOS), which controls certain basic functions of system 100.

FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 120 enabling data processing system 100 to communicate with other such systems. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

As disclosed herein, the system 100 includes machine readable instructions stored on machine readable media (for example, the hard disk 103) for providing extraction of SIMD parallelism. As disclosed herein, the instructions are referred to as a compiler 20. The compiler 20 may be produced using software development tools as are known in the art. As discussed herein, the compiler 20 is an embodiment of an enhanced SLP software.

Thus, as configured FIG. 1, the system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1.

Figure 2:
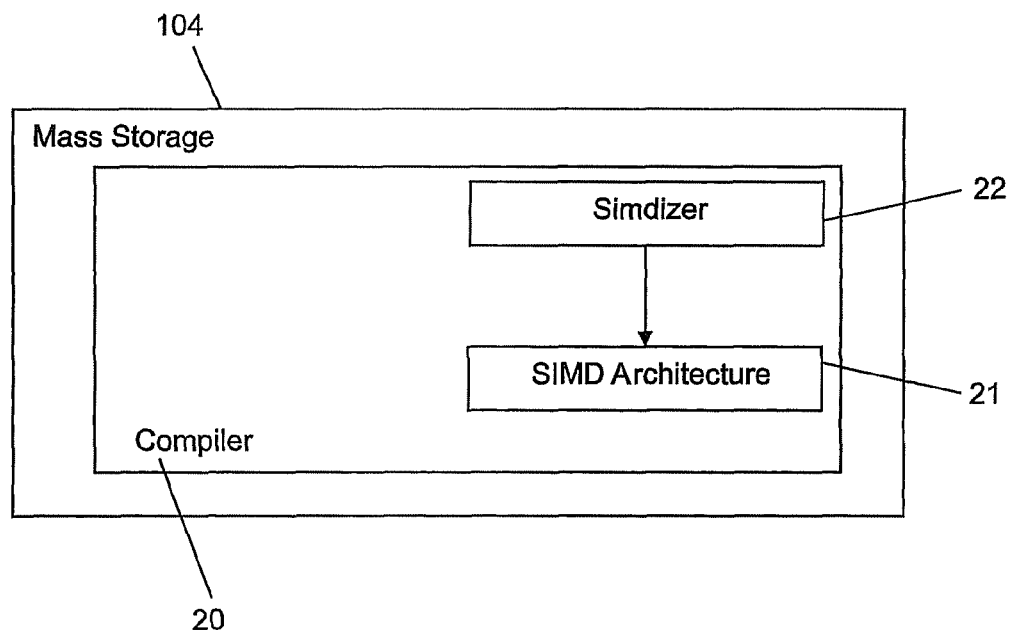
FIG. 2 depicts aspects of a compiler.

FIG. 2 illustrates exemplary aspects of the compiler 20. The compiler 20 is a computer program that translates text written in computer language into executable computer code. Referring to FIG. 2, in one embodiment, the compiler 20 is provided in the mass storage 104. A SIMD architecture 21 is provided in the compiler 20. A simdizer 22 also is provided in the compiler 20. The simdizer 22 generates instructions for the SIMD architecture 21. The compiler 20 instructions are executed by the processors 101.

Figure 3:
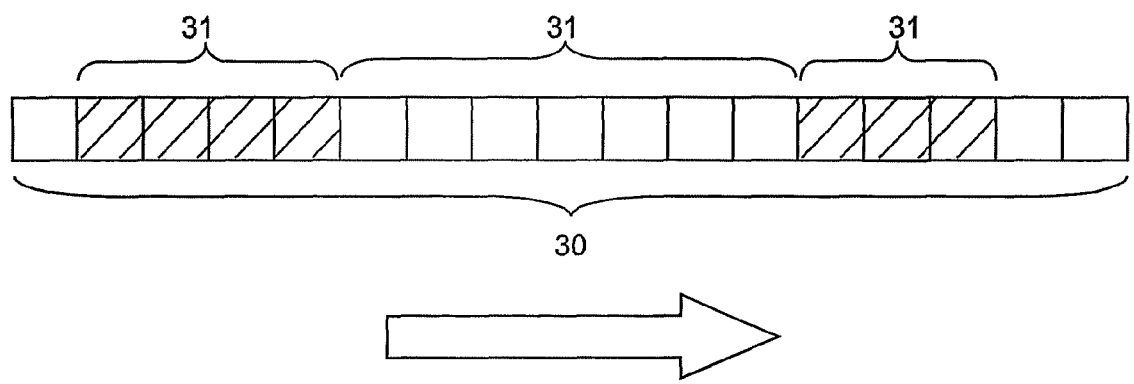
FIG. 3 depicts aspects of an input code stream.

Referring to FIG. 3, the compiler 20 reads a stream of a computer input code 30. The compiler 20 divides the input code 30 into a plurality of basic blocks 31. The basic blocks 31 are straight-line pieces of code without any jumps in the middle. The basic blocks 31 are the basic units to which compiler translations are applied. Any portion of the computer input code 30 that instructs the computer system 100 to perform a certain instruction, or set of instructions, repeatedly is called a "loop."

FIG. 4 illustrates certain aspects of the concept for extracting SIMD parallelism. The simdizer 22 searches the computer input code 30 at a level for the basic blocks 31 and at a level for a loop 42. If the simdizer 22 detects any opportunities to extract SIMD parallelism, then the simdizer 22 writes instructions for the SIMD architecture 21.

In many computer software applications, code sequences may not meet all the isomorphic criteria. For example, in some embodiments, the input code may represent many computations that are identical except for "+" and "−" signs. These code sequences can still benefit from SIMD execution. Refer to the code sequences in Table 2.

TABLE 2

Two Statements With Semi-Isomorphic Relationship

A[I − 1] = B[I − 1] * R2 − C[I − 1] * I2
A[I + 0] = B[I + 0] * I2 + C[I + 0] * R2

The two statements are isomorphic in relation to each other with the exception of the "+" and "−" signs. Each statement performs two multiplications. The second product of each statement is either subtracted or added to the first product. With the exception of the addition and subtraction, each statement performs the same operations in the same order. Such code sequences as in Table 2 are typical in applications for performing complex arithmetic. For example, the code sequences in Table 2 were extracted from SPECfp2000. SPECfp2000 is an industry-standardized CPU-intensive benchmark. The two statements in Table 2 are called "semi-isomorphic" with respect to each other. Another important property of these statements is that they use adjacent memory accesses. Specifically, with respect to memory accesses, A[I−1] is adjacent to A[I+0], B[I−1] is adjacent to B[I+0], and C[I−1] is adjacent to C[I+0].

FIG. 5 illustrates aspects of the SIMD architecture 21. The SIMD architecture 21 provides for an efficient implementation of the statements that are semi-isomorphic with respect to each other presented in Table 2. The set of additional operations that must be implemented, beyond those required by isomorphic statements, is called overhead. The overhead of semi-isomorphic packing for the statements presented in Table 2 is the additional multiply operation by a (−1, 1) literal vector 51. A literal vector has explicit numbers assigned to it. For architectures with multiply-and-add (FMA) support, the additional multiply operation is completely absorbed by an FMA unit 52, wherein FMA is an acronym representing "Fused Multiply-Add." FMA computes a multiply-accumulate factor. For example, FMA(A,B,C)=AB+C.

Where the operations on statements that are semi-isomorphic with respect to each other are more diverse than the ADD/SUBTRACT operation (in the example in FIG. 5), some computation may be needed for each of the different operations in the original computations. Whether this approach is beneficial or not will depend on the actual computations that are semi-isomorphic with respect to each other and the target system 100.

The scope of semi-isomorphic packing can be extended to include statements, which are non-isomorphic with respect to each other, that use stride-one memory accesses. A memory access is stride-one if it accesses adjacent segments of the memory 250 across consecutive iterations. FIG. 6 presents another example of packable non-isomorphic statements. These statements were also extracted from SPECfp2000. In this example, the non-isomorphic portions of the two statements are quite different but are stride-one across the loop 42. Because of the stride-one memory accesses in the group of statements that are non-isomorphic with respect to each other, the statements need not be packed with other computations to utilize the full bandwidth of the SIMD architecture 21.

Figure 7:
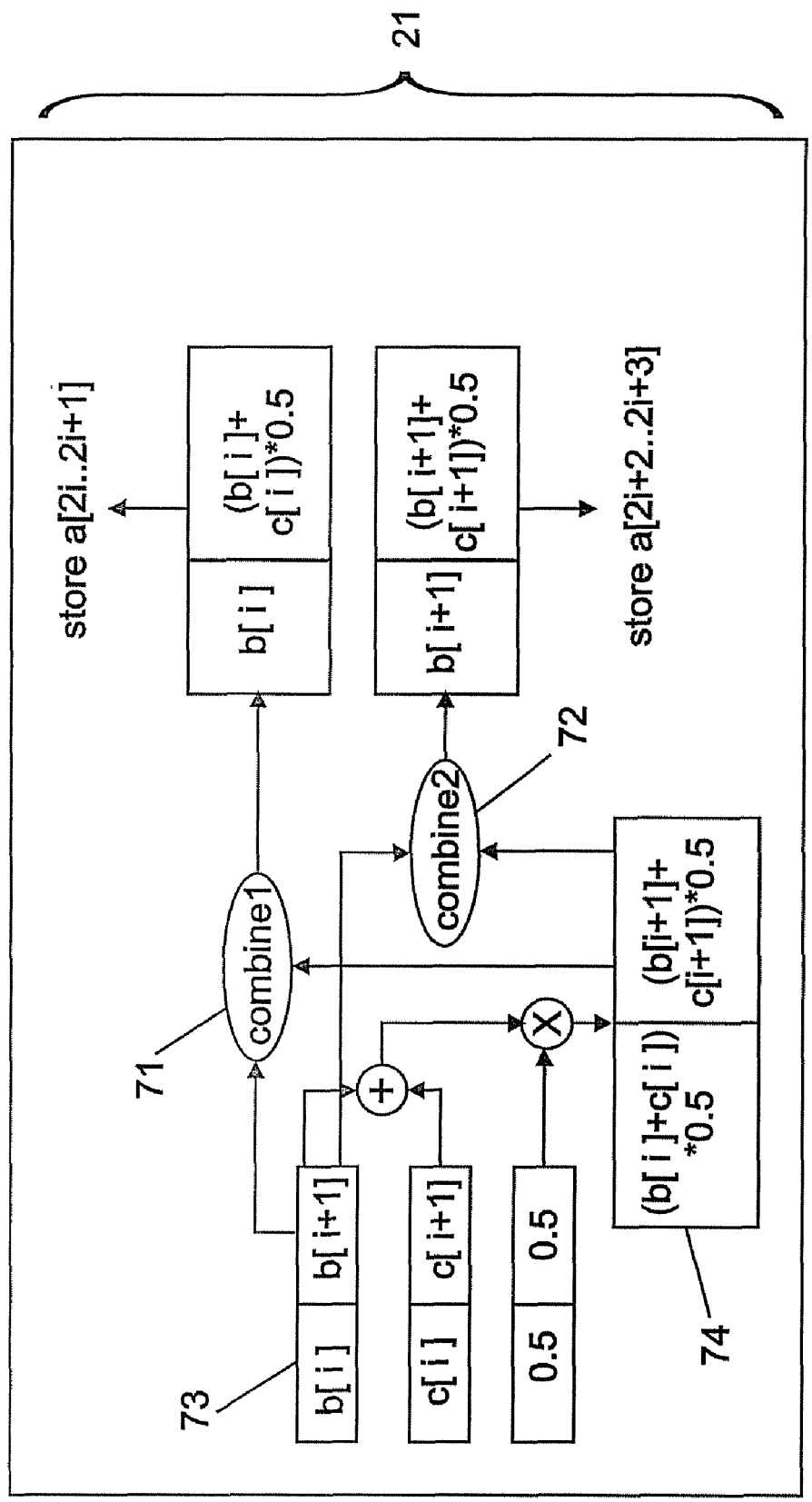
FIG. 7 illustrates one example of SIMD execution of the packable statements presented in FIG. 6.

FIG. 7 illustrates the SIMD architecture 21 execution of the statements that are non-isomolphic with respect to each other in FIG. 6. A "combine1" operation 71 is a pseudo (or abstract) operation that combines the even elements of a first input vector 73 and a second input vector 74. A "combine2" operation 72 is a pseudo operation that combines the odd elements of the first input vector 73 and the second input vector 74. Referring to FIG. 7, execution of the statements that are non-isomorphic with respect to each other uses the full computation and memory bandwidth of the SIMD architecture 21. The only overhead required is the combine1 operation 71 and the combine2 operation 72. The overhead is independent of the degree of difference between the statements being packed. This is an important property because it means that one can pack substantially different statements with a fixed overhead.

Figure 8:
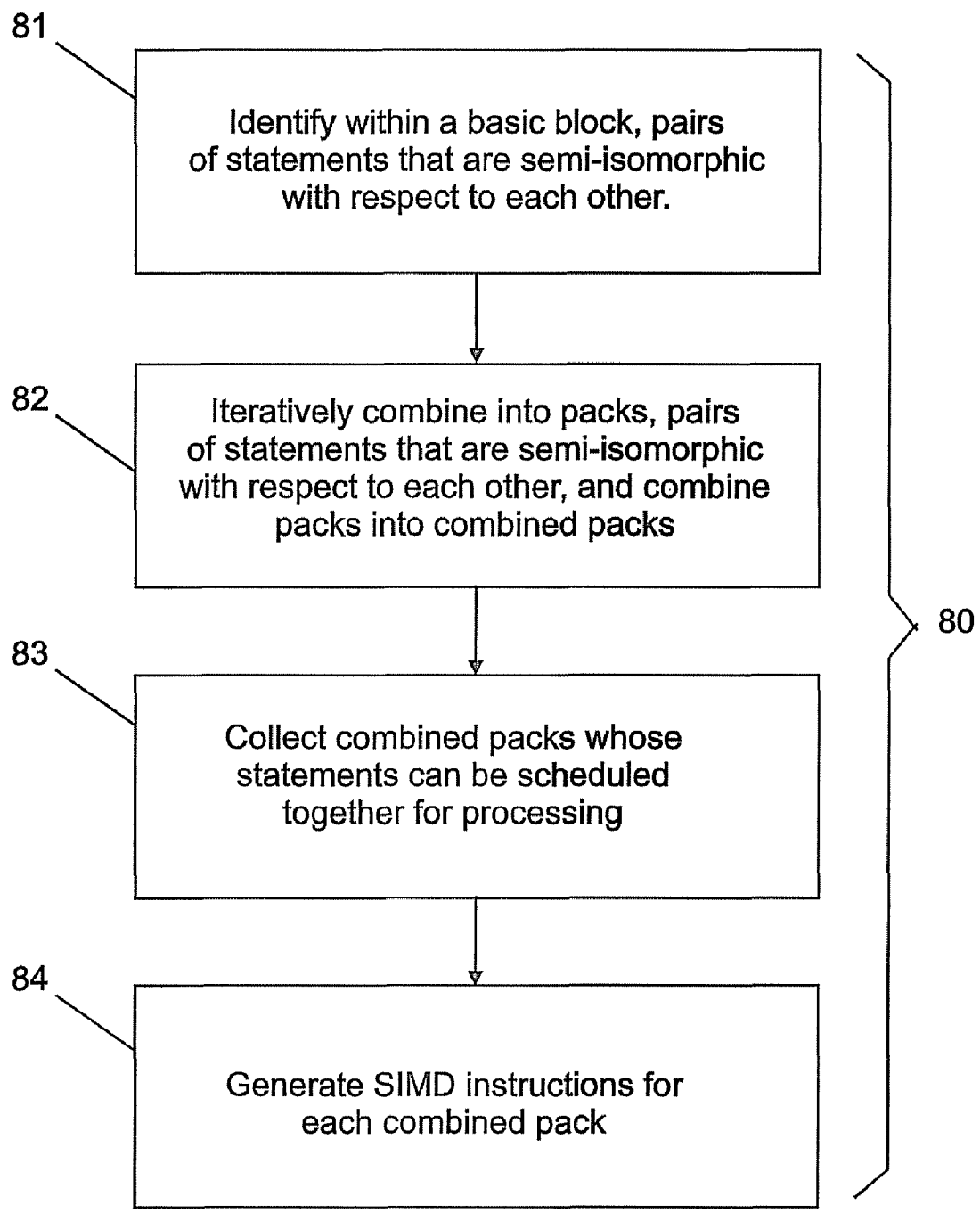
FIG. 8 is a flow chart of a method of packing statements that are semi-isomorphic in relation to each other.

FIG. 8 is a flow chart of a semi-isomorphic packing algorithm 80. A first step 81 calls for identifying pairs of statements that are semi-isomorphic with respect to each other within any of the basic blocks 31. A second step 82 calls for iteratively combining into packs, the pairs of statements, and combining the packs into combined packs. A third step 83 calls for collecting the combined packs whose statements can be scheduled together for processing. A fourth step 84 calls for generating SIMD instructions for each collected combined pack. Generating SIMD instructions for packs is called "simdization."

Referring to the first step 81 in FIG. 8, two expressions X and Y are semi-isomorphic with respect to each other, referred to as SISO(X,Y), if they satisfy any one of the rules provided in Table 3.

TABLE 3

Exemplary Rules For Identifying Statements With Semi-Isomorphic Relationship

Rule 1  When X and Y are identical.
Rule 2  When X and Y are literals.
Rule 3  When X and Y are loaded from adjacent memory locations.
Rule 4  When X and Y are stored to adjacent memory locations and the stored values are semi-isomorphic.
Rule 5  When X and Y have the same number of operands and their corresponding operands are semi-isomorphic.

With respect to Rule 3, since the compiler 20 has full control of where to place local variables, two local scalar variables are considered adjacent if they are considered adjacent in all their use and definitions in a given program region. This process is called scalar packing. With respect to rule 5, technically, there are no restrictions on the X and Y operations; in practice, however, it may be beneficial to only consider operations with similar overhead.

The rules for defining a semi-isomorphic relationship can be formalized as provided in Table 4.

TABLE 4

Exemplary Rules For Identifying Statements With Semi-Isomorphic Relationship

| | |
|---|---|
| Rule 1 | SISO(X, Y) with X == Y. |
| Rule 2 | SISO(literal 1, literal 2), regardless of the values of the literal. |
| Rule 3 | SISO(load Xaddr, load Yaddr) with Xaddr and Yaddr accessing adjacent memory locations. |
| Rule 4 | SISO(store(Xaddr, Xval), store(Yaddr, Yval)) with Xaddr and Yaddr accessing adjacent memory locations and with SISO(Xval, Yval). |
| Rule 5 | SISO(Xop(Xoper.1, . . . , Xoper.n), Yop(Yoper.1, . . . , Yoper.n)) with SISO(Xoper.i, Yoper.i) holding for any i in 1, . . . , n. |

Referring to the fourth step 84 in FIG. 8, generating SIMD instructions for semi-isomorphic packs calls for representing packable computations as MIMD operations on vectors. As used herein, vectors are data structure arrays. One example of a MIMD operation is <+,−,+,−> where "<" and ">" represent delimiters of the operation. Regular SIMD operations can be represented, for example, as <+,+,+,+>.

Table 5 presents four statements that are semi-isomorphic in relation to each other.

TABLE 5

Four Statements With Semi-Isomorphic Relationship a[4i + 0] = b[2i + 0] + c[2i + 0]
a[4i + 1] = b[2i + 1] * c[2i + 1]
a[4i + 2] = b[2i + 2] * c[2i + 2]
a[4i + 3] = b[2i + 3] * c[2i + 3]

These statements can be packed to:

a[4i . . . 4i+3]=b[4i . . . 4i+3]<+,*,*,*>c[4i . . . 4i+3].

Any MIMD operation can be implemented using SIMD operations and a SIMD select operation denoted as SEL. SEL, in the form of SEL i1,i2,i3, represents an operation that selects bytes from two vectors, i1 and i2, based on the value of the third vector, i3. Specifically, for each element of i3, if the element equals 0, the corresponding element of i1 is selected, otherwise, the corresponding element of i2 is selected. For example, a MIMD operation, x<+,*,*,*>y, can be implemented as SEL (x+y) (x*y) (0,−1,−1,−1) where (0,−1,−1,−1) is a vector literal of four elements.

The number of different operations in a MIMD operation determines how many SEL operations are needed. MIMD operation emulated on SIMD architectures incurs the overhead of SEL and wastes SIMD computation bandwidth as each SEL combines two vectors of computed values into one vector. On the other hand, SIMD emulation of MIMD operations allows the full use of SIMD memory bandwidth and some SIMD computation bandwidth, which otherwise may be executed sequentially. For the same performance consideration, packing operations with drastically different latencies into MIMD operation (e.g., "+" with "/") should be avoided.

For certain patterns of MIMD operations, much more efficient SIMD instructions can be generated exploiting arithmetic properties. For example, any combination of "+" and "−", such as x<+,−,−,−>y, can be implemented as: x+(y*(1,−1,−1,−1)).

If the target architecture supports multiply-add, the sequence can be mapped to the FMA unit 52 incurring virtually no overhead.

A cost model is needed to determine whether writing SIMD instructions for a MIMD operation is profitable or not, depending on the targeting architecture. For example, it would be profitable to write SIMD instructions for a MIMD operation if on the selected architecture, scalar execution is inefficient compared to execution using SIMD architecture.

The rules for defining a semi-isomorphic relation can be relaxed to include more distinct expressions while still resulting in efficient SIMD instructions. For example, in Rule 5, the requirement to have the same number of operands in the X and Y expressions can be dropped. Table 6 presents two statements that are non-isomorphic in relation to each other.

TABLE 6

Two Statements With Non-Isomorphic Relationship a[i + 0] = b[i + 0] * b[i + 0] + c[i + 0]
a[i + 1] = b[i + 1] & c[i + 1]

The input to the FMA operation in the b[i+0]*b[ i+0]+c[i+0] computation and the AND operation in the b[i+1] & c[i+1] computation do not satisfy the conditions for the relationship between semi-isomorphic computation statements. The FMA (multiply-add) has 3 and the AND has 2. Code can be efficiently generated for this example, by loading the "b" and "c" memory streams, feeding both streams to the FMA as well as to the AND, and then selecting alternating results from the FMA and the AND operations before storing them into the "a" memory stream.

A definition for another embodiment of Rule 5 (represented as Rule 5') is provided as:

Rule 5': SISO(Xop(Xoper.1, . . . ,Xoper.n), Yop(Yoper.1, . . . Yoper.m)), where for each i in 1 . . . n, there is at least one j in 1 . . . m for which SISO(Xoper.i, Yoper.j), and for each j in 1. . . . m, there is at least one i in 1. . . n for which SISO(Xoper.i, Yoper.j).

Using Rule 5', focus would be on semi-isomorphic expressions where there are clusters of one or more operations that are different, as long as the inputs are similar.

The scope of semi-isomorphism is further extended to accommodate codes like the one in FIG. 6. The code in FIG. 6 exhibits a property called stride-one semi-isomorphism. FIG. 9 presents one example of a method 90 that exploits stride-one semi-isomorphism. A first step 91 calls for identifying when two statements, X and Y, are stride-one semi-isomorphic with respect to each other at the level of the basic blocks 31. Two statements, X and Y, are defined as stride-one semi-isomorphic with respect to each other when they satisfy any of the rules in Table 7.

TABLE 7

Rules For Identifying Statements With Stride-One Semi-Isomorphic Relationship

| | |
|---|---|
| Rule 1 | X and Y are semi-isomorphic. |
| Rule 2a | If X and Y have the same number of operands, and each of the corresponding operands of X and Y, Xoper.i and Yoper.i, are semi-isomorphic. |

TABLE 7-continued

Rules For Identifying Statements With Stride-One Semi-Isomorphic Relationship

| Rule 2b | If X and Y have the same number of operands, and for each of the corresponding operands of X and Y, Xoper.i and Yoper.i, all of the memory nodes in X are stride-one memory accesses as well as all of the memory nodes in Y are stride-one memory accesses. |

Stride-one semi-isomorphic packing relies upon both SLP, as implied by the "packing" part, and loop-level parallelism, as implied by the "stride-one" part. The loop 42 in FIG. 6 is used to illustrate the algorithm. A second step 92 calls for iteratively combining into packs, the pairs of statements, and combining the packs into combined packs. A third step 93 calls for collecting the combined packs whose statements can be scheduled together for processing. For example, the statements depicted in FIG. 6 are packed to:

for (i=0; i<n; i++)

a[2i . . . 2i+1]=Gather(b[i]0.5*(b[i]+c[i]))

where "Gather" is a pseudo (or abstract) operation that combines two values into a vector of two elements. A fourth step 94 calls for aggregation of statements that are stride-one semi-isomorphic with respect to each other at the level of the loop 42. For the loop 42 in FIG. 6, since all memory accesses in the loop are stride-one, the loop is further aggregated with a blocking factor of 2 (i.e., unroll the loop by two and pack the unrolled iterations into vector computation):

for (i=0; i<n; i+=2)

a[2i . . . 2i+3]=Gather'(b[i . . . i+1], 0.5*(b[i . . . i+1]+ c[i . . . i+1]))

where "Gather'" is a pseudo operation that interleaves elements of input 2-element vectors into a vector of 4-elements. "Gather'" will eventually be mapped to a SIMD shuffle/permute operation. A fifth step 95 calls for generating SIMD instructions for each pack of loop statements and each of the combined packs.

Because stride-one semi-isomorphic packing relies on simdization at both the level of the basic blocks 31 and the level of the loop 42, packed statements may not always be simdizable in later loop level simdization. In that case, the computation will be converted back from vector codes to scalar codes.

For statements packed as stride-one semi-isomorphic packs, the SIMD instructions resulting from the fifth step 95 are highly efficient. The only overhead is the additional "Gather" operations. Unlike other semi-isomorphic computation generating SEL operations, stride-one semi-isomorphic packing fully uses the computation and memory bandwidth of the SIMD unit.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product stored on machine readable media and providing instructions for extracting SIMD parallelism from statements that are not isomorphic with respect to each other, the instructions comprising:
   providing a stream of input code comprising basic blocks;
   identifying within a basic block pairs of statements that are semi-isomorphic with respect to each other;
   iteratively combining into packs the pairs of statements and combining the packs into combined packs;
   collecting the combined packs whose statements can be scheduled together for processing; and
   generating SIMD instructions for each collected combined pack to provide for extracting SIMD parallelism.

2. The computer program product as in claim 1, wherein identifying comprises satisfying a condition where X and Y are identical.

3. The computer program product as in claim 1, wherein identifying comprises satisfying a condition where X and Y are literals.

4. The computer program product as in claim 1, wherein identifying comprises satisfying a condition where X and Y are loaded from adjacent memory locations.

5. The computer program product as in claim 1, wherein identifying comprises satisfying a condition where X and Y are stored to adjacent memory locations and the stored values are semi-isomorphic with respect to each other.

6. The computer program product as in claim 1, wherein identifying comprises satisfying a condition where X and Y have the same number of operands and their corresponding operands are semi-isomorphic with respect to each other.

7. The computer program product as in claim 1, wherein identifying comprises satisfying a condition where X and Y have a different number of operands and for each Xoper.i there is a Yoper.j where the relationship between the Xoper.i and the Yoper.j is semi-isomorphic and for each Yoper.j there is an Xoper.i where the relationship between the Yoper.j and the Xoper.i is semi-isomorphic.

8. The computer program product as in claim 1, wherein the stream of input code comprises basic blocks comprising a set of at least two different arithmetic operators and generating SIMD instructions comprises:
   replacing a set of operators with a Multiple Instruction Multiple Data (MIMD) operator;
   generating SIMD instructions for parallel processing of each operator in the set; and
   generating SIMD select instructions to implement the MIMD operator.

9. A computer implemented method to extract SIMD parallelism from statements that are not isomorphic with respect to each other, the method comprising:
   providing a stream of input code comprising basic blocks;

identifying within a basic block, pairs of statements that are stride-one semi-isomorphic with respect to each other;

iteratively combining into packs the pairs of statements and combining packs into combined packs;

collecting combined packs whose statements can be scheduled together for processing;

aggregating into packs loop statements that are stride-one semi-isomorphic with respect to each other at the loop level; and generating SIMD instructions for each pack of loop statements and each of the combined packs to extract SIMD parallelism.

10. The method as in claim 9, wherein identifying comprises satisfying a condition that X and Y are semi-isomorphic with respect to each other.

11. The method as in claim 9, wherein identifying comprises satisfying a condition that X and Y have the same number of operands, and corresponding operands, Xoper.i and Yoper.i, are semi-isomorphic with respect to each other.

12. The method as in claim 9, wherein identifying comprises satisfying a condition that X and Y have the same number of operands, and for corresponding operands, Xoper.i and Yoper.i, all of the memory nodes in X and Y comprise stride-one memory accesses.

13. The method as in claim 9, wherein the stream of input code comprises basic blocks comprising a set of at least two different arithmetic operators and generating SIMD instructions comprises:

replacing the set of operators with a MIMD operator;

generating SIMD instructions for parallel processing of each operation in the set; and generating SIMD select instructions to implement the MIMD operator.

14. A computer program product stored on machine readable media and providing instructions for extracting SIMD parallelism from statements that are not isomorphic with respect to each other, the instructions comprising:

providing a stream of input code comprising basic blocks;

identifying within a basic block, pairs of statements that are semi-isomorphic with respect to each other by satisfying at least one condition where: X and Y are identical, X and Y are literals, X and Y are loaded from adjacent memory locations, X and Y are stored in adjacent memory locations and the stored values are semi-isomorphic with respect to each other, X and Y have the same number of operands and their corresponding operands are semi-isomorphic with respect to each other;

iteratively combining into packs, the pairs of statements and combining packs into combined packs;

collecting combined packs whose statements can be scheduled together for processing; and generating SIMD instructions for each collected pack to provide for extracting SIMD parallelism.

\* \* \* \* \*